July 12, 1938.  D. L. THOMAS  2,123,216
MEASURING AND SURVEYING DEVICE
Filed June 11, 1937   2 Sheets-Sheet 1
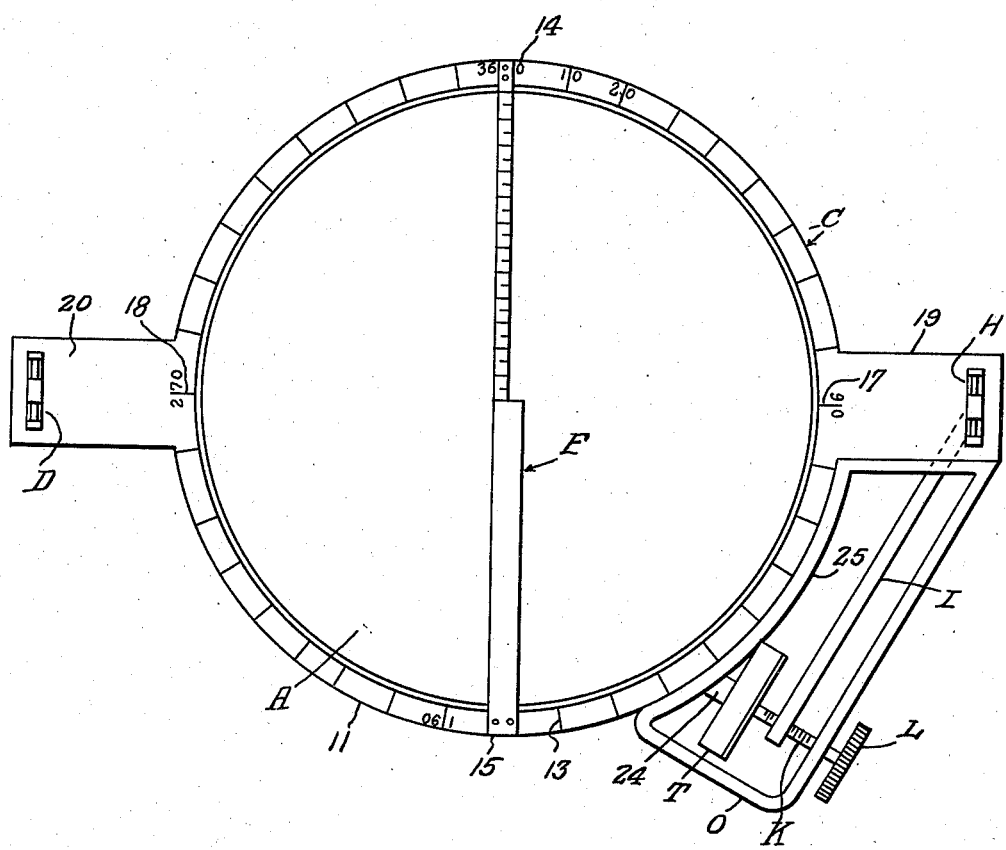
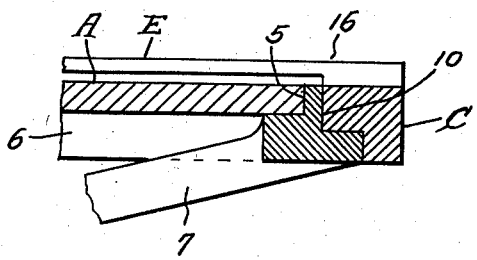
Inventor
D. L. Thomas,
By *Clarence A. O'Brien*
*Hyman Berman*
Attorneys

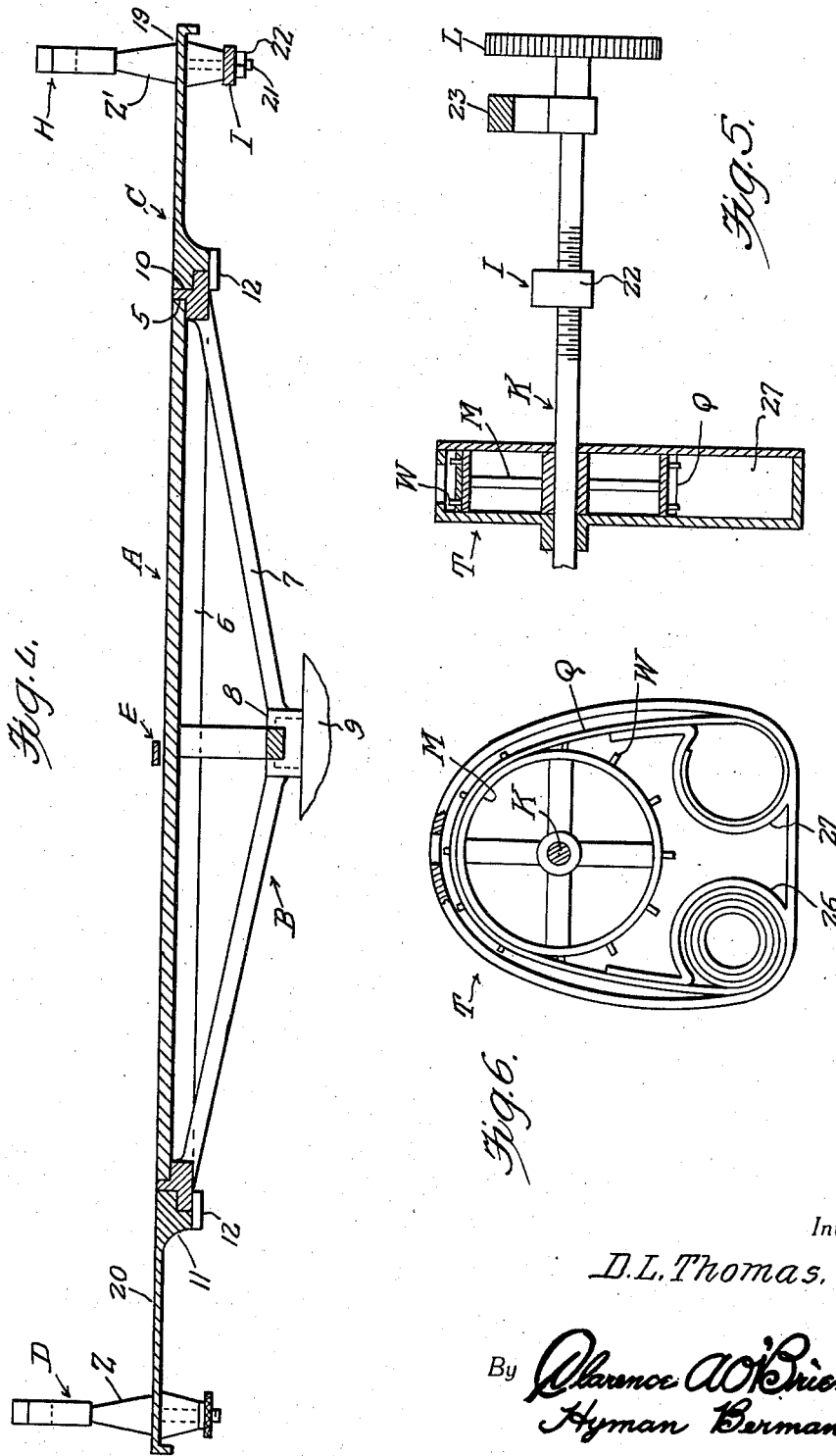

Patented July 12, 1938

2,123,216

UNITED STATES PATENT OFFICE 2,123,216

MEASURING AND SURVEYING DEVICE

Dillwyn L. Thomas, Butte, Mont.

Application June 11, 1937, Serial No. 147,753

2 Claims. (Cl. 33—66)

My invention relates generally to means utilized in the measurement and plotting of tracts of land, and particularly to an instrument for the rapid and accurate measurement and plotting of tracts of land enabling the maintenance of a high degree of accuracy without sacrifice of speed of operation, and which also enables the greatest simplicity of operation while maintaining accuracy to a high degree.

Other important objects of my invention will be apparent from a reading of the following description taken in connection with the drawings, wherein for purposes of illustration I have shown a preferred embodiment of my invention.

In the drawings:—

Figure 1 is a general top plan view of the embodiment.

Figure 2 is a general longitudinal vertical sectional view taken approximately centrally through Figure 1.

Figure 3 is an enlarged transverse vertical sectional view taken through a peripheral portion of Figure 1.

Figure 4 is a transverse vertical sectional view taken through the tangent screw and showing the mounting of the variable telescope arm thereon.

Figure 5 is an enlarged transverse vertical sectional view taken through the tape housing alongside of the screw.

Figure 6 is an enlarged sectional elevational view showing the tape housing with the cover thereof removed.

Referring in detail to the drawings, the letter A generally designates a drafting table of circular form which is made of wood or other suitable light weight material whose peripheral edges are received in a groove 5 in the top of a metal rim 6 which is supported by radial spiders 7 projecting from a hub 8 and constituting a support generally designated B. The hub 8 is threaded or otherwise suitably formed to constitute means for attaching the instrument to a leveling tripod 9 similar to those used for supporting other types of surveying instruments.

The rim 6 has an outside groove 10 defining the support for the base line and telescope bracket C which includes the rim 11. The support B may be rotated on a vertical axis on the tripod arrangement 9.

The base line and telescope bracket C is so arranged that it may be rotated on the support B or clamped thereto at will. The bracket C is held in place on the supporting surface 10 by lugs 12 which project under the rim 6 as shown in Figure 2 of the drawings, one of which lugs is in the form of a clamp for clamping the bracket C to the support rim 6. The rim portion 11 of the bracket C is calibrated as indicated by the numeral 13 around its circumference from zero to 360 degrees, in degrees and fractional divisions of degrees so as to form a complete protractor. The zero point is designated by the numeral 14.

From this zero point 14 and extending to the 180 degree point which is designated 15 extends a scale and ruler E which is fastened at its opposite ends in a bridging manner as indicated at 16 in Figure 3 of the drawings so as to clear the drafting table A and rotate with the bracket C.

At the 90 degree point 17 and the 270 degree point 18 are wings or brackets 19 and 20, respectively, which project from the rim 11. A fixed telescope D is mounted on the bracket 20 while a variable telescope H is mounted on the bracket 19, with the vertical axes of the telescope and the 90 degree and 270 degree points aligned, and with the telescopes a known distance apart.

The fixed telescope D is fixed and set by its telescope standard Z so that its line of sight is at right angles to the line joining the vertical axes of the telescopes. The standard Z' of the variable telescope H, whose axis is designated 21 passes through the bracket 19 and has clamped thereto by a nut 22 or other suitable means in a firm manner one end of the variable telescope arm I in such a manner that any horizontal movement of the variable telescope arm I will cause a deflection of the line of sight of the variable telescope H. Threaded through a fixed lug 22 on the opposite end of the arm I as indicated in Figure 4 of the drawings is the variable telescope arm tangent screw K in such a manner that the slightest turn of the tangent screw will cause a horizontal movement of the arm I and a deflection of the line of sight of the variable telescope H. The screw K is supported by bearings 23 and 24 on the generally rectangular support O in such a manner that rotation of the screw is permitted without lateral or longitudinal motion thereof. The support O is in the nature of a frame having one end attached to the bracket 19 and with the inward longitudinal side 25 curved and conforming to and attached to the rim 11. The tangent screw K has a knurled nut L at its outer end to enable manually turning the screw and the inner end of the screw K has firmly attached to it the tape drum or sprocket M with the tape Q trained thereover and firmly pressed on the circumference of the drum with the ends thereof coiled in the pockets 26 and 27 in the enclosing housing T which is mounted on the bearing 24. Pins W on the periphery of the drum M engage holes in the tape Q so that the tape is caused to move exactly as the drum or sprocket is rotated. The holes in the tape and the sprocket pins are so arranged that there is no slipping or crawling relative movement. By means of these arrangements, any movement of the tension screw K by operation of the knurled nut L will cause a deflection of the line of sight of the variable telescope H and a proportional movement of the calibrated tape Q. If this deflection is toward the line of sight of the fixed telescope D then the two lines of sight of the telescopes will cross and if the tape is properly calibrated it will register the distance from the line of the vertical axes of the telescopes and which these lines of sight cross.

By setting the instrument at a central point and reading the distances from the central point, and the angular direction between the points, many problems involved in surveying may be solved.

As an example of use of the device of the invention, let it be assumed that an irregular field or plot of land is to be surveyed, plotted, and its area determined.

A position, either within or without the plot, from which the plot is entirely visible is selected, and the device of the invention mounted upon its tripod. Drafting paper is inserted beneath the scale and ruler E and fixed in place with thumb tacks or clamps. The telescope bracket C is then turned to the zero setting and clamped and the instrument is leveled and turned on the tripod so that the fixed telescope vertical cross hair bisects the surveyor's rod when held in a vertical position at one corner of the field. The support C is then firmly clamped in this position. The tangent screw wheel L is then turned until the variable telescope vertical cross hair also bisects the rod. The reading of the tape Q is then taken and scaled on a line drawn, by means of the scale and ruler E, from the center of the instrument toward the outer circumference of the drafting board A. The rodman is then signaled to proceed to the next corner of the plot or tract of land where he erects the rod and maintains it in position and vertical until all readings have been taken similarly at that point. The telescope bracket is then unclamped and the variable telescope is rotated until the vertical cross hair of the fixed telescope bisects the rod in its new position and the telescope bracket is again clamped in this position. The variable telescope H is again moved until its vertical cross hair bisects the rod and the reading is then taken and scaled and drawn as before, the angle of deflection being read on the periphery of the telescope bracket C and recorded between the first and second lines.

The rodman is then signaled to proceed to the next corner where this procedure is repeated and this procedure is gone through at each corner of the field until the point of beginning is reached. The point of beginning is then checked to determine if any errors have been made. The drafting paper is removed and the ends of the intersecting lines joined by straight lines and a plot, drawn to scale with all necessary data to compute the area recorded, results.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

What is claimed is:—

1. A surveying instrument of the character described, said instrument comprising a support adapted for mounting on a tripod or the like, a drafting board mounted on said support, a rotary telescope bracket rotatably mounted on said support, said bracket including a circular calibrated rim surrounding said drafting board, a calibrated ruler extending between opposite sides of said rim and fastened thereto to overlie the drafting board, a stationary telescope on one side of said bracket, a rotatably adjustable telescope on the opposite side of said bracket, said telescopes having their vertical axes lying in a vertical plane passing through a diameter of said circular rim and the line of sight of the stationary telescope at right angles thereto, and means operatively connected with said adjustable telescope for selectively rotating the same to a position in which its line of sight is at an acute angle to that of the stationary telescope.

2. A surveying instrument of the character described, said instrument comprising a support adapted for mounting on a tripod or the like, a drafting board mounted on said support, a rotary telescope bracket rotatably mounted on said support, said bracket including a circular calibrated rim surrounding said drafting board, a calibrated ruler extending between opposite sides of said rim and fastened thereto to overlie the drafting board, a stationary telescope on one side of said bracket, a rotatably adjustable telescope on the opposite side of said bracket, said telescopes having their vertical axes lying in a vertical plane passing through a diameter of said circular rim and the line of sight of the stationary telescope at right angles thereto, and means operatively connected with said adjustable telescope for selectively rotating the same to a position in which its line of sight is at an acute angle to that of the stationary telescope, said means comprising a tangent screw, bracket means supporting said screw for rotation but precluding lateral movement of the screw, a tape drum on said bracket means and operatively connected to said screw, a calibrated tape trained over said drum, a rigid arm threaded on said screw and having a portion operatively engaged with said adjustable telescope, whereby upon manual turning of said screw, said adjustable telescope and said tape will be proportionately moved from an established initial position indicated by said tape.

DILLWYN L. THOMAS.